INVENTORS
PETER A.E GARDNER
MICHAEL H. HALLETT
BY James E. Murray
ATTORNEY

United States Patent Office 3,504,351

Patented Mar. 31, 1970

3,504,351

DATA STORE

Peter A. E. Gardner, Winchester, and Michael H. Hallett, Chandlers Ford, England, assignors to International Business Machines Corporation, Armonk, N.Y., a corporation of New York Filed Jan. 2, 1968, Ser. No. 695,065

Claims priority, application Great Britain, May 11, 1967, 21,920/67

Int. Cl. G11c *5/06;* H03k *23/08*

U.S. Cl. 340—173 12 Claims

ABSTRACT OF THE DISCLOSURE

This specification describes data storage systems that perform logical functions. These data storage systems include bistable data storage cells arranged in a matrix of word lines and sense lines. The arrangement of storage cells, word lines and sense lines is such that a signal produced by interrogation of one storage cell can be used to set, to an information significant state, a second storage cell coupled to the same sense line and conditioned to respond to the signal. The storage cells are designed so that the conditioning of the second storage cell to respond to the signal inhibits the propagation of the signal to other storage cells further along the sense line. This permits a number of different logical functions to be performed with different cells connected to the same sense line.

SUMMARY OF THE INVENTION

The present invention relates to data storage systems and more particularly to data storage systems which perform logical functions.

U.S. patent application Ser. No. 618,673 filed Feb. 27, 1967, discloses a data storage system capable of performing logical functions. This storage system contains a number of storage cells joined by word and sense lines into a matrix in which signals produced by the interrogation of one storage cell can be used to set, to an information significant state, a second storage cell connected to the same sense line and conditioned to respond to the signal. In accordance with the present invention, two or more such logical functions can be performed with storage cells on the same sense line. In the illustrated data storage systems this is accomplished with storage cells which, when conditioned to respond to the signal, inhibit the propagation of the signal to other storage cells further along the sense line.

Therefore it is an object of the present invention to provide a data storage system capable of performing logical functions.

It is another object of the present invention to provide a data storage system capable of simultaneously performing two or more logical functions.

It is still another object of the present invention to provide a data storage system which inhibits the propagation of signals along its sense lines so as to isolate sections of the system and thereby permit performance of different logical functions in the isolated sections.

DESCRIPTION OF THE DRAWINGS

The foregoing and other objects, features and advantages of the invention will be apparent from the following more particular description of the preferred embodiments of the invention as illustrated in the accompanying drawings of which.

DESCRIPTION OF THE PREFERRED EMBODIMENTS

Figure 1:
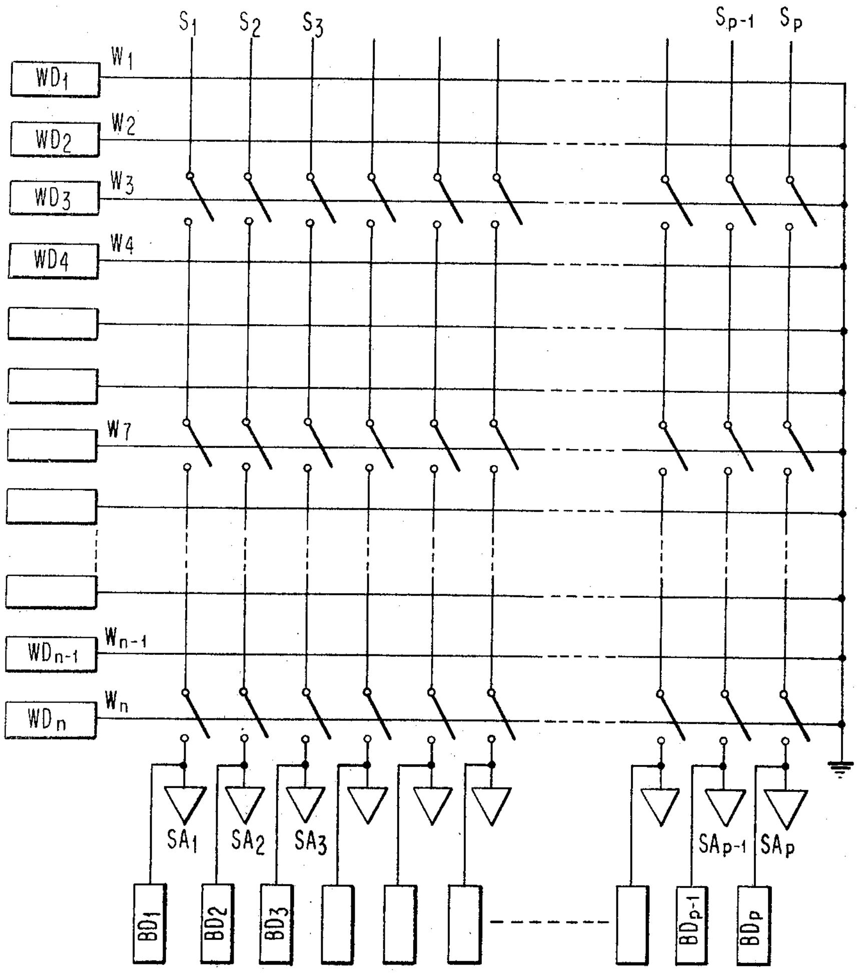
FIGURE 1 shows schematically a data store which operates in accordance with the invention.

The data store shown schematically in FIGURE 1 consists of word lines $W_1$ to $W_n$ arranged in rows and bit/sense lines $S_1$ to $S_p$ arranged in columns to form a matrix. A data storage element is provided at each cross-over point of a word line W with a bit/sense line S although these have been omitted from the drawing for the sake of clarity. Energization of a word driver $WD_1$ to $WD_n$ producing an interrogation pulse on the associated word line causes the data stored by the data storage elements in that word to be read out in parallel onto the bit/sense lines $S_1$ to $S_p$. Each element connected to the energized word line stores a "bit" of data and when interrogated produces either a positive or negative signal on the associated sense line, or a signal or no signal on the sense line, indicating the value of the bit stored. The nature of the output signal depends on the data storage element used in the store.

An essential feature of the store is that a signal obtained as a result of interrogating an element is of sufficient magnitude to set another element connected further along the same sense line in an information significant state provided that the further element is conditioned to respond to such a signal. An element is normally conditioned for this "writing" operation by putting it in a more sensitive state. For example, a thin magnetic film used as a storage element is conditioned for writing by rotating its magnetic vector into the hard direction of magnetization. A positive or negative signal along a drive line parallel to the axis and coupled to the film determines the direction along the easy axis along which the vector ultimately lies. Several other elements that fulfill this requirement and have the added advantage of retaining their information on interrogation are used in the data store described and claimed in U.S. application Ser. No. 618,673 filed Feb. 27, 1967.

The store shown in FIGURE 1 of the present invention makes use of the fact that output signals on the sense lines can be used to write into other elements in the array. By this means data can be directly transferred from one word location to another in the store. The store shown in FIGURE 1 is used in a conventional manner for the storage of data. That is, data words are stored in rows and energization of one word driver $WD_1$ to $WD_n$ causes a pattern of signals of one or other polarity (or a combination of signals and no signals depending on the type of data storage element used) to be produced in parallel on the sense lines $S_1$ to $S_p$. These read-out signals pass to sense amplifiers $SA_1$ to $SA_p$ which respond to the signals in the usual manner.

Data is written in a particular location by the coincident selection of the word driver $WD_1$ to $WD_n$ and the bit driver $BD_1$ to $BD_p$ uniquely associated with the element. Usually a whole word is written in one operation by energization of all the bit drivers $BD_1$ to $BD_p$ together with one word driver $WD_1$ to $WD_n$. As will have been realized the bit and sense lines are common since write and read operations are never performed at the same time. Naturally suitable gating arrangements are provided for read and write operations but since these do not form an important part of the invention they are not described or shown in FIGURE 1.

The use of common bit/sense lines $S_1$ to $S_p$ makes it possible to utilize the feature of the store, briefly described above, that output signals on the sense line can be used to write into other elements in the array. By this means data stored in the elements of a particular word can be directly transferred to other elements at a different word location in the store simply by interrogating the elements storing the word to read out the data and arranging for the elements to which the data is to be transferred to be conditioned for a write operation. This technique is useful for performing simple logical operations in the store itself, some of which are described in our copending application referred to above.

The data store shown in FIGURE 1 includes the additional feature that the sense line is broken when it reaches an element that is conditioned for a write operation. Thus suppose that word 1 (associated with word driver $WD_1$) is to be transferred to the word 3, (associated with word driver $WD_3$). Word driver $WD_1$ is energized to interrogate the elements storing the word to be transferred and a pattern of pulses is produced on the sense line representing the data stored in the word. At the same time the elements forming word 3 (associated with word driver $WD_3$) are conditioned for a write operation and the sense lines are broken. The signals resulting from the interrogation of word 1 propagate along the sense lines $S_1$ to $S_p$ and set the elements in word 3 in an information significant state either storing the same data as word 1 or its complement. Since the sense lines are broken at word 3, the propagation of the signals to further elements is inhibited (the manner in which the sense lines are broken will be described later when the preferred storage elements are described in detail) and consequently a similar transfer operation can be performed at the same time further along the sense lines without the two operations interfering with each other. Thus word 4 may be transferred to the elements storing word 7, provided these elements are conditioned for a write operation. The sense lines are broken again and so yet another operation can be performed and so on. The automatic breaking of the sense lines (shown in FIGURE 1 as a simple switch) enables a number of similar operations to be performed simultaneously in the store and considerable logical power is gained.

Figure 2:
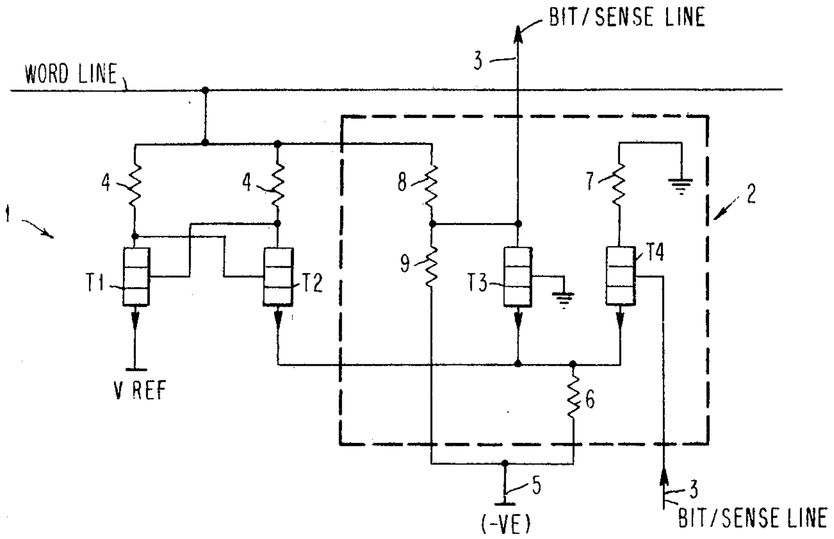
FIGURE 2 shows a data storage element suitable for use in the store shown schematically in FIGURE 1.

FIGURE 2 shows an arrangement for implementing the invention described above. The figure shows one data storage element 1 coupled between a WORD LINE and a BIT/SENSE LINE. Each BIT/SENSE LINE consists of a number of sense circuits (shown generally as reference number 2 in FIGURE 2) interconnected by sense conductors 3.

The data storage element 1 consists of two transistors $T_1$ and $T_2$ cross-coupled to form a bistable circuit. The collectors of the two transistors are connected through equal resistors 4 to the WORD LINE. The emitter of $T_1$ is connected to a source of reference potential (VREF) and the emitter of $T_2$ is connected to a negative supply terminal 5. In operation the WORD LINE is maintained at a positive potential and one or the other of the transistors $T_1$ or $T_2$ is conducting. Arbitrarily if $T_1$ is conducting the element is said to be storing a binary ZERO and if $T_2$ is conducting it is said to be storing a binary ONE.

The sense circuit 2 is seen to consist of two transistors $T_3$ and $T_4$ sharing a common emitter load 6 which is connected to the negative supply terminal 5. The sense conductor 3 from the preceding element coupled to the same BIT/SENSE LINE is connected to the base electrode of transistor $T_4$. Another sense conductor 3 is connected from the collector electrode of transistor $T_3$ of the sense circuit to the base electrode of transistor $T_4$ of the sense circuit of the succeeding element coupled to the same BIT/SENSE LINE. The collector electrode of transistor $T_4$ is connected through a load 7 to ground and the base of transistor $T_3$ is maintained at ground potential. The voltage supply for transistor $T_3$ is taken from the junction of resistors 8 and 9 which are connected across the supply from the WORD LINE to the negative supply terminal 5. The values of the resistors 8 and 9 and the supply voltage across them is chosen so that transistor $T_3$ is normally conducting.

To interrogate the element the voltage of the WORD LINE is raised and a positive pulse passes through the transistor $T_1$ or $T_2$ conducting at the time. Suppose that transistor $T_1$ is conducting storing a binary ZERO, then the interrogate pulse does not affect the sense circuit 2 of the BIT/SENSE LINE coupled to the element and no pulse is passed along the sense conductor 3 to the succeeding stage. Suppose however that transistor $T_2$ is conducting, storing a binary ONE. Then, the interrogate pulse produced by raising the word line potential passes through transistor $T_2$ and resistor 6 to the negative terminal 5. This results in $T_3$ being cut off for the duration of the interrogate pulse and consequently the collector voltage of $T_3$ will rise resulting in a positive pulse on the sense conductor 3 connected to the sense circuit of the succeeding stage. Thus a pulse on the sense conductor to the succeeding stage indicates that the element interrogated is storing a binary ONE whereas no pulse indicates that it is storing a binary ZERO.

To "write" information the element is first conditioned by lowering the potential of the WORD LINE to cause both transistors $T_1$ and $T_2$ to be cut off. When the word line potential is thereafter restored to its normal operating potential, the transistor having the most negative emitter will conduct.

The potential at the emitter of transistor $T_1$ is fixed while the potential at the emitter of transistor $T_2$ is dependent on whether or not transistor $T_4$ is conducting. When transistor $T_4$ is non-conducting, as is the case when no positive pulse is present on the sense conductor 3 from the preceding element the potential of the emitter of $T_2$ is clamped by the base/emitter junction of transistor $T_3$ at a $V_{be}$ drop below ground potential. When transistor $T_4$ is conducting, which occurs when there is a positive pulse on the sense conductor 3, the emitter potential of transistor $T_2$ rises nearer to ground potential. The precise value to which it rests depends on the value of resistor 7 and resistor 6. Thus if $V_{REF}$, the emitter supply for $T_1$ is chosen to lie between the two extreme potentials of the emitter of $T_2$, the state of the element 1 can be controlled by a pulse or no pulse on the BIT/SENSE LINE from the preceding stage. Then during a "write" operation when there is no pulse on the sense conductor 3 from the preceding element the emitter potential of $T_1$ is lower than the emitter potential of $T_2$ and consequently when the potential of the word line is restored to its normal operating potential the transistor $T_1$ will conduct and transistor $T_2$ will be cut off. If a positive pulse is present on the sense conductor 3 from the preceding element then the emitter potential of $T_2$ is the lower and, provided the WORD LINE potential is restored to its normal operating potential before the pulse terminates, transistor $T_2$ will conduct and transistor $T_1$ will be cut off.

Therefore it can be seen that a binary ONE is written in an element simply by lowering the WORD LINE potential sufficiently low for the difference in emitter potential of $T_1$ and $T_2$ to be effective and then raising it to its normal value, and a binary ZERO is written by lowering the word line potential while supplying the sense conductor 3 connecting the base electrode of $T_4$ of the sense circuit with a positive pulse of a sufficient magnitude to cause this transistor to conduct. The WORD LINE potential must be restored before the pulse terminates.

The positive pulse required to write a ZERO may be applied directly to the BIT/SENSE LINE from the bit driver, as shown in FIGURE 1, or may be obtained by reading out an element further down the same BIT/SENSE LINE that is storing a binary ONE. Thus data read out from one element can be directly written into another element in complement form. Normally, a positive pulse on the sense conductor 3 from a preceding element is effectively passed through the sense circuit 2 and continued on to the next element. This is because transistor $T_4$ conducts and transistor $T_3$ is cut-off for the duration of the pulse thereby causing a potential rise at the collector of transistor $T_3$ that transmits a pulse of similar magnitude on the sense conductor 3 to the succeeding element. However, if the element is conditioned for a write operation this pulse at the collector of transistor $T_3$ is inhibited preventing a signal transmission to elements coupled further along on the BIT/SENSE LINE. The inhibiting of the pulse is a result of the lowering of the WORD LINE potential for a write operation. This causes transistor $T_3$ to be effectively removed from the bit line path resulting in the collector of $T_3$ being maintained at a low level. Thus parallel transfer operations can be performed between elements further along the same sense line.

Figure 3:
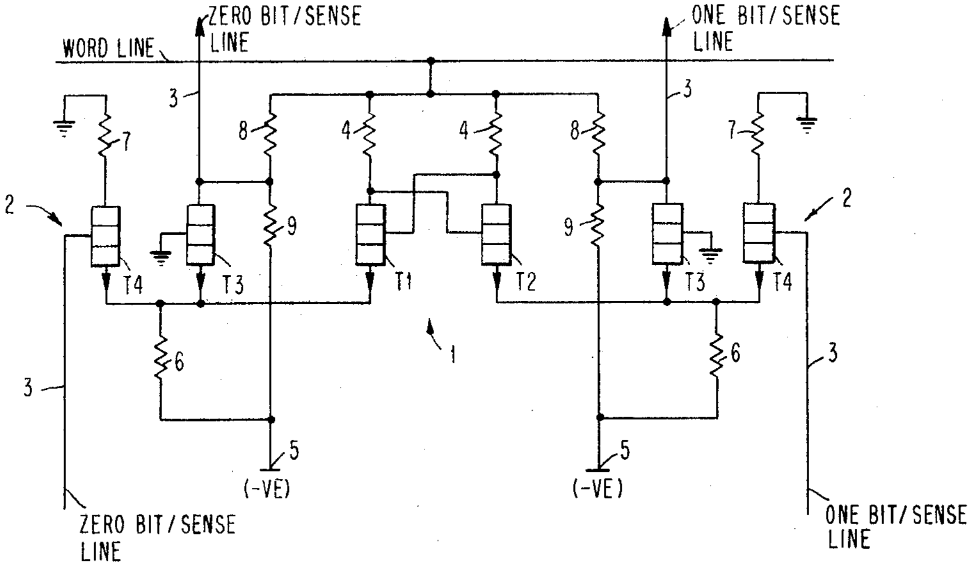
FIGURE 3 shows a data storage element suitable for use in data stores having twin bit/sense lines.

Another arrangement shown in FIGURE 3, makes use of twin BIT/SENSE LINES. Instead of connecting the emitter electrode of transistor $T_1$ to the reference voltage source $V_{REF}$, it is connected to a second sense circuit which forms part of a second BIT/SENSE LINE. The two sense circuits associated with each element are identical in all respects and the corresponding components in each have been given the same reference numerals. It is seen in this arrangement that interrogation of an element storing a binary ONE will produce a positive pulse on the right hand BIT/SENSE LINE which is designated the ONE BIT/SENSE LINE whereas an element storing a ZERO will produce a positive pulse on the left hand or ZERO BIT/SENSE LINE. To write into the element the potential of the WORD LINE is lowered as before and a differential voltage applied to the two BIT/SENSE LINES coupled to the element. The differential voltage may be applied directly when the store is being used in a normal manner or may be provided by interrogating a preceding element.

While the invention has been particularly shown and described with reference to the preferred embodiments thereof, it will be understood by those skilled in the art that various changes in form and details may be made therein without departing from the spirit and scope of the invention.

What is claimed is:

1. In a data storage system comprising an array of bistable data storage elements connected in a matrix of word lines and sense lines so that a signal on a sense line produced by interrogation of one data storage element is transmitted to a second data storage element coupled to the same sense line, the improvement which comprises:

(a) means for conditioning said second data storage element to respond to such a signal so as to place said second data storage element in an information significant state; and (b) means for inhibiting the propagation of the signal to other data storage elements further along the sense line when said second data storage element is so conditioned.

2. A data storage system as claimed in claim 1, in which the sense lines are arranged in pairs and each data storage element is coupled between a unique combination of a word line and a sense line pair.

3. A data storage system as claimed in claim 1, in which the sense lines are arranged singly and each data storage element is coupled between a unique combination of word line and sense line.

4. A data sorage as claimed in claim 2, in which each element is a bistable element which transmits an interrogation pulse applied to the word line to one sense line of the sense line pair when the element is in one stable state and to the other sense line of the sense line pair when the element is in the other stable state.

5. A data storage system as claimed in claim 3, in which each element is a bistable circuit which transmits an interrogation pulse applied from the word line to the sense line when the bistable circuit is in one stable state but not when it is in the other stable state.

6. A data storage system as claimed in claim 1, wherein said means for inhibiting the propagation of the signal includes a sense circuit associated with each element coupled to the line, and sense conductors interconnecting the sense circuits to thereby form said sense lines.

7. A data storage storage system as claimed in claim 6, in which each data storage element comprises two transistors cross-coupled to form a bistable circuit so that in one stable state the first of the two transistors conducts alone and in the other stable state the second of the two transistors conducts alone.

8. A data storage system as claimed in claim 7, in which said sense circuit associated with a particular data storage element is connected to respond to a current pulse through one of the transistors of the data storage element but not to respond to a current pulse through the other transistor.

9. A data storage system as claimed in claim 7, in which one of the pair of sense lines associated with a particular element is connected to respond to a current pulse through one of the transistors of the data storage element and the other of the pair of sense lines is connected to respond to a current pulse through the other of the transistors of the data storage element.

10. A data storage system as claimed in claim 8, in which said sense circuit responds to a current pulse through said one of the transistors by producing a pulse on a sense conductor connecting the sense circuit to the sense circuit of another data storage element coupled to the same sense line.

11. A data storage system as claimed in claim 10, wherein said means for conditioning said second storage element includes:

(a) means for temporarily dropping excitation potential across the two transistors forming the bistable circuit of the second storage element; and (b) means for supplying to the second storage element a signal from its associated signal circuit when the first storage element produces a signal on the sense line.

12. A data storage system as claimed in claim 11, wherein said means for inhibiting the propagation of the signal includes means for essentially decoupling the signal circuit associated with the second storage element from the line when the excitation potential across the two transistors forming the bistable of the second storage element is dropped.

References Cited

UNITED STATES PATENTS

| | | | |
|---|---|---|---|
| 3,175,185 | 3/1965 | Wolfe | 340—174 |
| 3,441,912 | 4/1969 | Henle | 340—173 |

TERRELL W. FEARS, Primary Examiner

U.S. Cl. X.R.

307—221, 224; 328—37